United States Patent
Hasani et al.

(10) Patent No.: US 11,451,998 B1
(45) Date of Patent: Sep. 20, 2022

(54) SYSTEMS AND METHODS FOR COMMUNICATION SYSTEM RESOURCE CONTENTION MONITORING

(71) Applicant: Meta Platforms, Inc., Menlo Park, CA (US)

(72) Inventors: Naader Hasani, San Jose, CA (US); Gregory Robbins Steinbrecher, Menlo Park, CA (US); Hans-Juergen Schmidtke, Mountain View, CA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 16/778,542

(22) Filed: Jan. 31, 2020

Related U.S. Application Data

(60) Provisional application No. 62/872,820, filed on Jul. 11, 2019.

(51) Int. Cl.
| | |
|---|---|
| *H04W 28/02* | (2009.01) |
| *H04W 72/04* | (2009.01) |
| *H04L 47/625* | (2022.01) |
| *H04L 47/32* | (2022.01) |
| *H04L 47/2408* | (2022.01) |

(52) U.S. Cl.
CPC ..... *H04W 28/0242* (2013.01); *H04L 47/2408* (2013.01); *H04L 47/32* (2013.01); *H04L 47/6255* (2013.01); *H04W 72/0446* (2013.01)

(58) Field of Classification Search
CPC .......... H04W 28/0242; H04W 72/0446; H04L 47/32; H04L 47/6255; H04L 47/2408
See application file for complete search history.

(56) References Cited

U.S. PATENT DOCUMENTS

| | | | | |
|---|---|---|---|---|
| 7,502,884 B1* | 3/2009 | Shah | ................... | H04L 67/1097 370/395.21 |
| 2002/0136163 A1* | 9/2002 | Kawakami | .............. | H04L 47/26 370/229 |
| 2014/0071831 A1* | 3/2014 | Sinha | .................. | H04L 41/0213 370/241.1 |
| 2014/0078903 A1* | 3/2014 | Edsall | ..................... | H04L 47/29 370/235 |
| 2014/0105218 A1* | 4/2014 | Anand | ................ | H04L 49/9036 370/412 |
| 2014/0160975 A1* | 6/2014 | Cociglio | ............. | H04L 43/0829 370/252 |

(Continued)

*Primary Examiner* — Christine Ng
(74) *Attorney, Agent, or Firm* — FisherBroyles, LLP

(57) ABSTRACT

The disclosed method may include (1) detecting, by a communication resource of a communication system, an event indicative of traffic congestion in the communication resource, where the communication resource services one or more traffic flows, and where at least one of the traffic flows causes the event, (2) sampling, by the communication resource, in relation to detecting the event, status data indicating a current status of the communication resource during each of a plurality of time intervals, (3) transmitting, by the communication resource, to a receiving device external to the communication resource to control the communication system, at least one of (a) at least a portion of the status data that is associated with the at least one of the traffic flows or (b) control information for the at least one of the traffic flows based on that status data. Various other methods and systems are also disclosed.

20 Claims, 8 Drawing Sheets

(56) References Cited

U.S. PATENT DOCUMENTS

| | | | |
|---|---|---|---|
| 2014/0254385 A1* | 9/2014 | Tabatabaee | H04L 43/062 370/236 |
| 2014/0269379 A1* | 9/2014 | Holbrook | H04L 43/0882 370/252 |
| 2017/0359749 A1* | 12/2017 | Dao | H04W 24/08 |
| 2018/0063007 A1* | 3/2018 | Johnson | H04L 49/50 |
| 2018/0103094 A1* | 4/2018 | Wetterwald | H04W 4/70 |
| 2020/0328807 A1* | 10/2020 | Jiang | G06N 3/04 |

\* cited by examiner

SYSTEMS AND METHODS FOR COMMUNICATION SYSTEM RESOURCE CONTENTION MONITORING

CROSS REFERENCE TO RELATED APPLICATION

This application claims the benefit of U.S. Provisional Application No. 62/872,820, filed Jul. 11, 2019, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
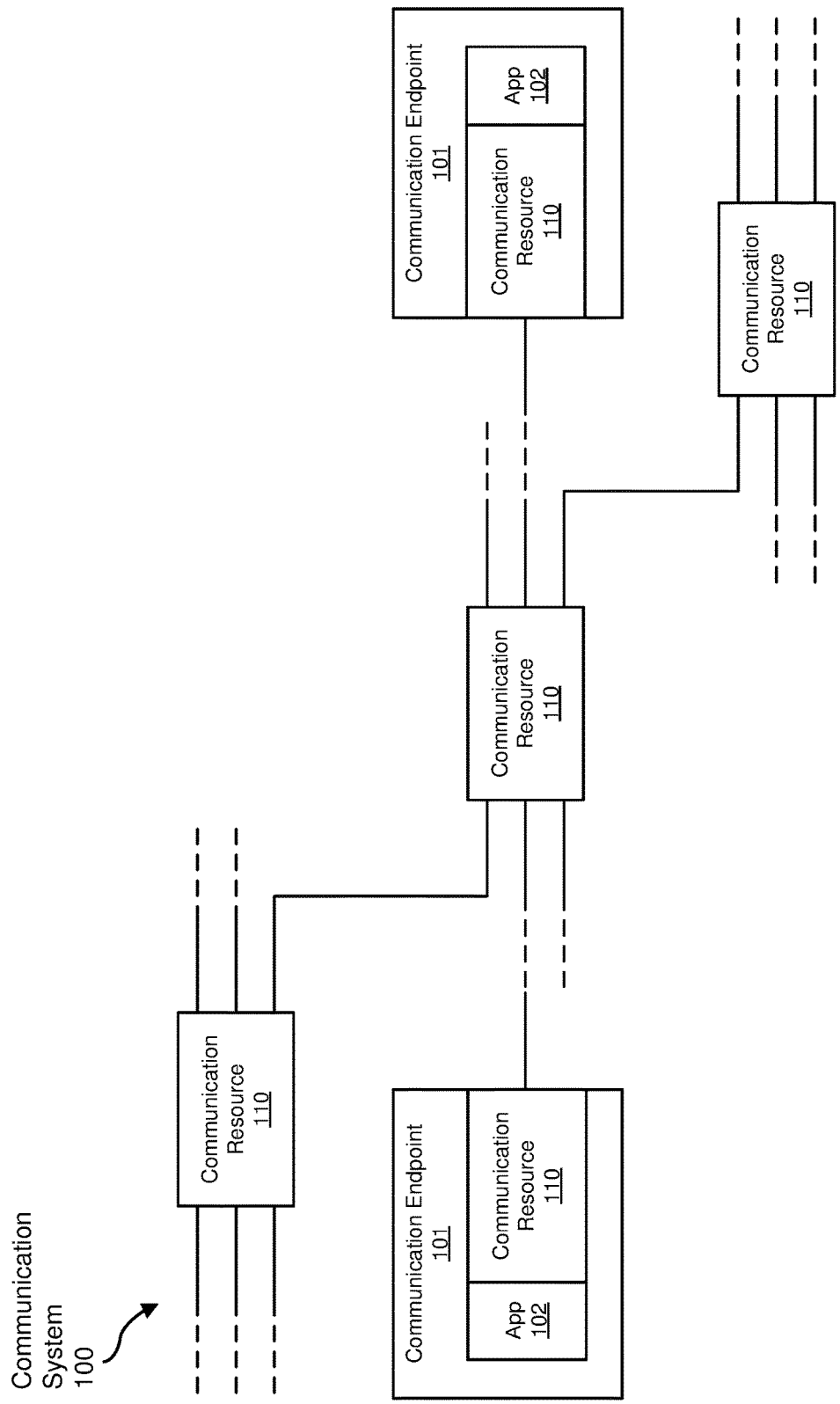
FIG. 1 is a partial block diagram of an exemplary communication system.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

A persistent problem in communication systems in general, and packet-based communication networks in particular, is resource contention. For example, a data link, switch, hub, router, or other resource may receive a sufficient amount of communication data over some period of time that causes the resource to lose or "drop" some of that data. For example, if the communication resource employs a buffer memory to temporarily store previously received communication data prior to transmitting that data to another device within the system, a full buffer, or a full pertinent part of that buffer, may cause data loss, such as by writing newly received data over previously received data stored in the buffer memory, or by dropping the newly received data instead of writing that data to the buffer.

In some cases, a source of the lost data, or another device in the communication system, may respond to the loss of a portion of the data being transmitted by resending that data over the communication system. Beyond the increase in latency of the data flows or streams directly involved, the additional data traffic associated with the retransmissions may in turn cause increased contention and associated data loss in other unrelated data flows.

Interestingly, while contention for communication system resources often occurs when average utilization of those resources is high, contention may also occur when average resource utilization is extremely low. For example, "microburst" transmissions, in which a significant amount of data is transmitted over a network during a short period of time (e.g., less than a millisecond) (and thus may dominate the bandwidth of a communication resource), followed by a longer period of time during which little or no data is transmitted, may also result in resource contention. While at least some communication resources may capture and provide access to information that describes usage levels of those resources, micro-burst transmissions and other quickly occurring contention issues are traditionally difficult to capture and monitor. Furthermore, in such examples, adding additional buffer memory or providing more capacity in other ways to the various systems resources may not be economically viable, and may only postpone contention issues in the communication system.

The present disclosure is generally directed to systems and methods for monitoring communication system resource contention. As will be explained in greater detail below, embodiments of the present disclosure may facilitate the capture and analysis of quickly occurring contention issues in a timely manner. Given such information, one or more components of the affected communication system may be able to react to this information in a timely manner by altering the operation of one or more applications, communication resources, and other devices or systems to reduce the number of contention issues in the near future.

Features from any of the embodiments described herein may be used in combination with one another in accordance with the general principles described herein. These and other embodiments, features, and advantages will be more fully understood upon reading the following detailed description in conjunction with the accompanying drawings and claims.

Figure 2:
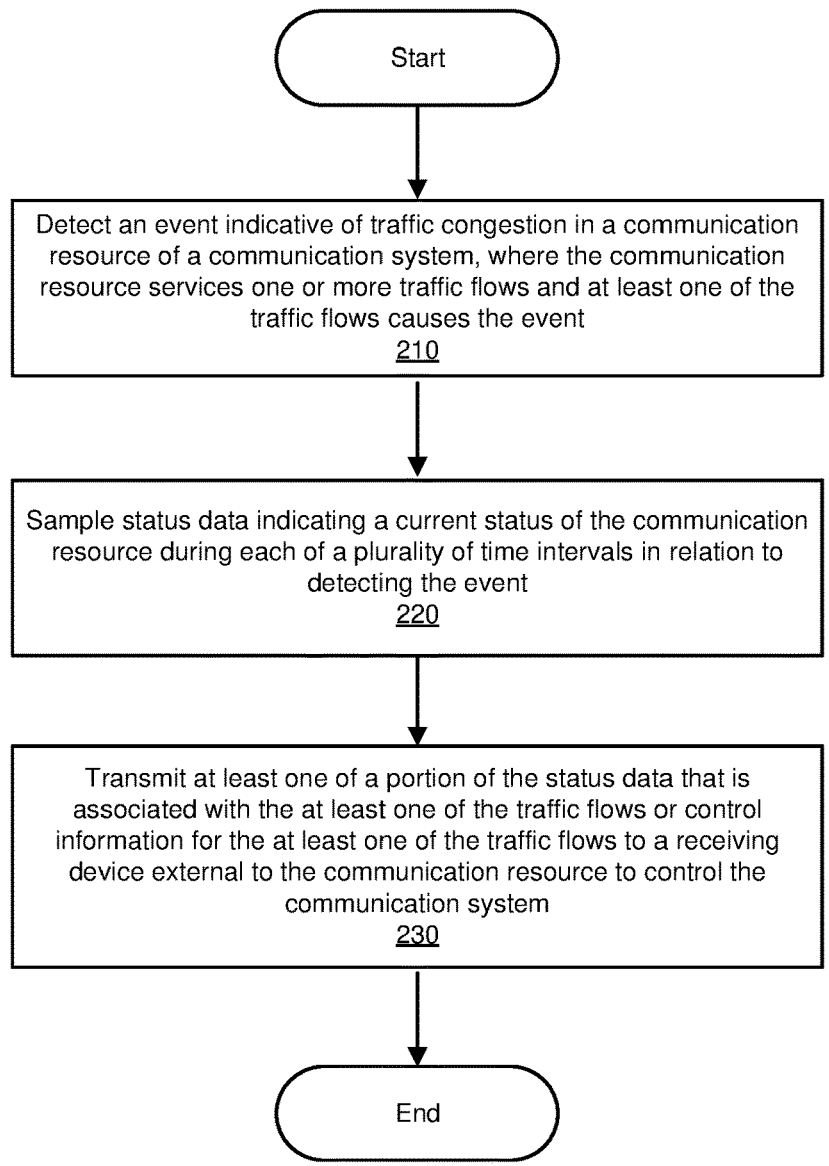
FIG. 2 is a flow diagram of an exemplary method for monitoring a communication resource of a communication system, such as the communication system of FIG. 1.
Figure 3:
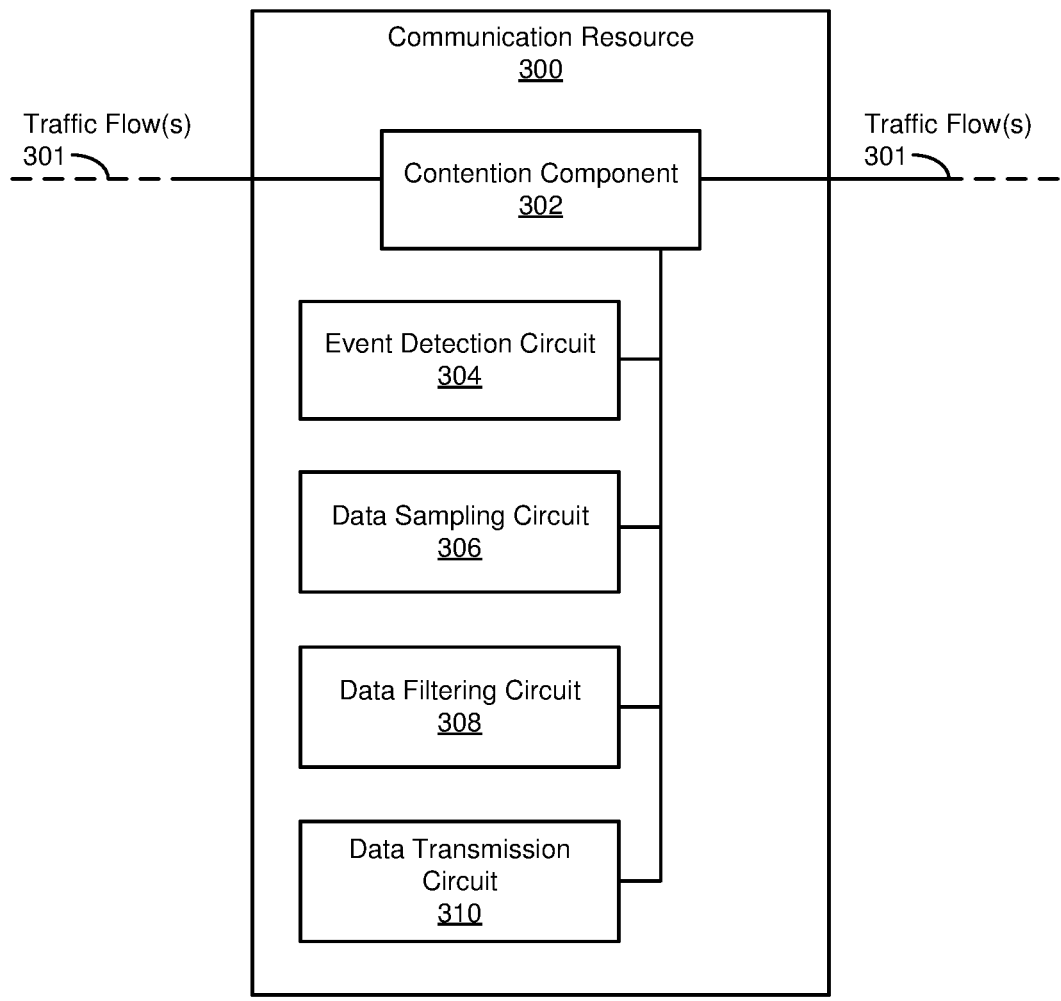
FIG. 3 is a block diagram of an exemplary communication resource employable in a communication system, such as the communication system of FIG. 1.
Figure 4:
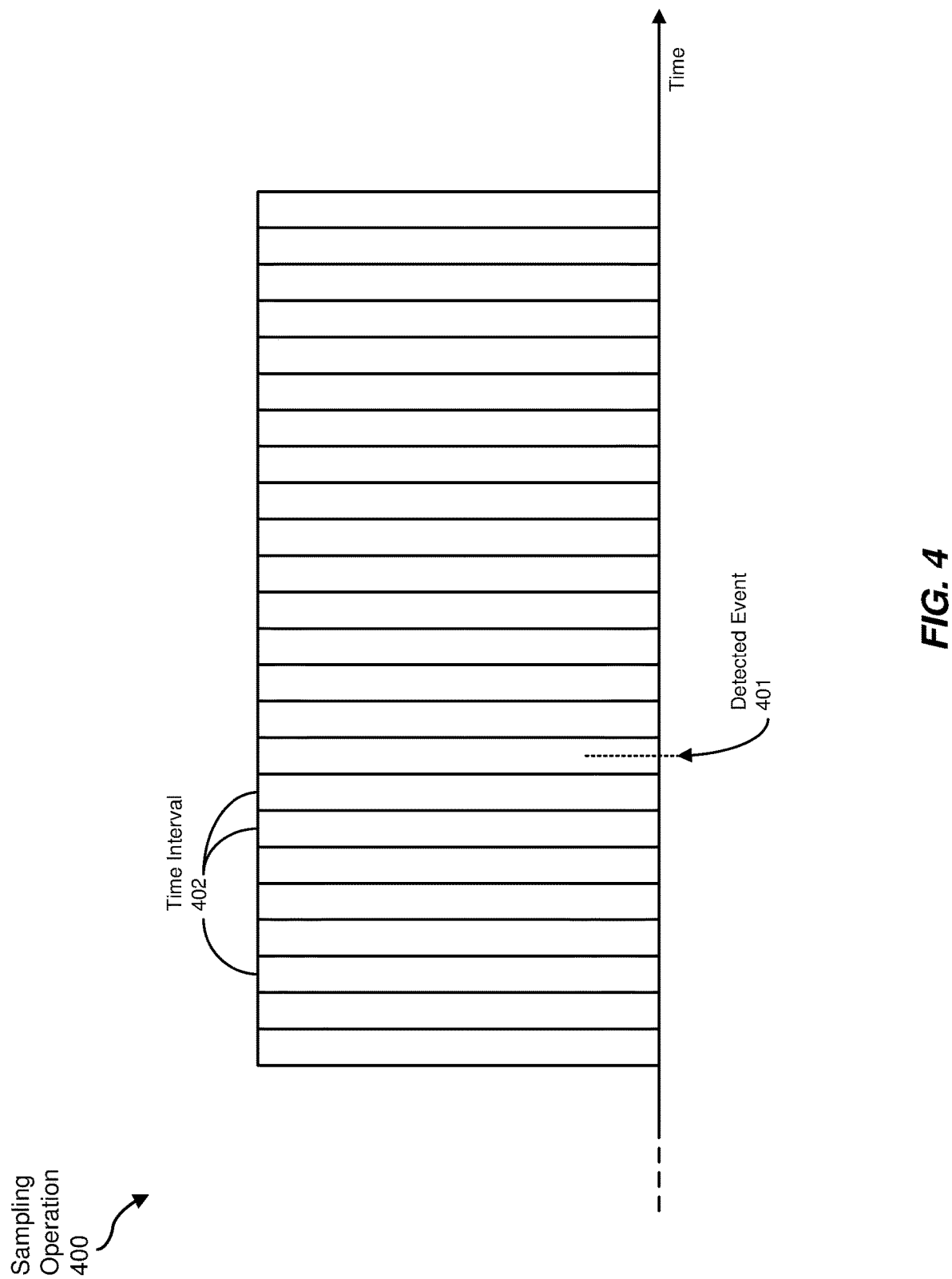
FIG. 4 is a timing diagram of a sampling operation that may be performed in the communication resource of FIG. 3.
Figure 5:
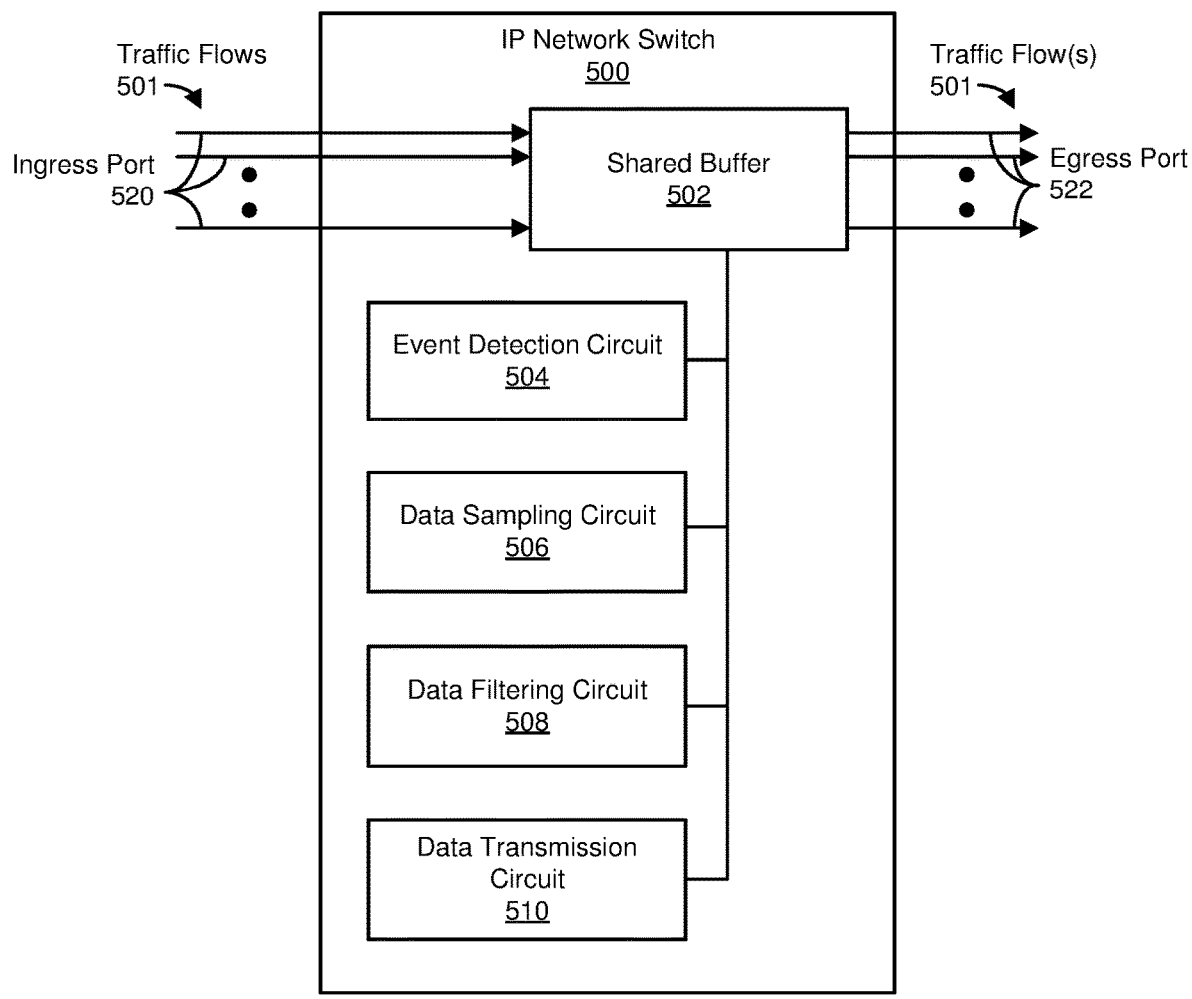
FIG. 5 is a block diagram of an exemplary Internet Protocol (IP) network switch employable in a communication system, such as the communication system of FIG. 1.
Figure 6:
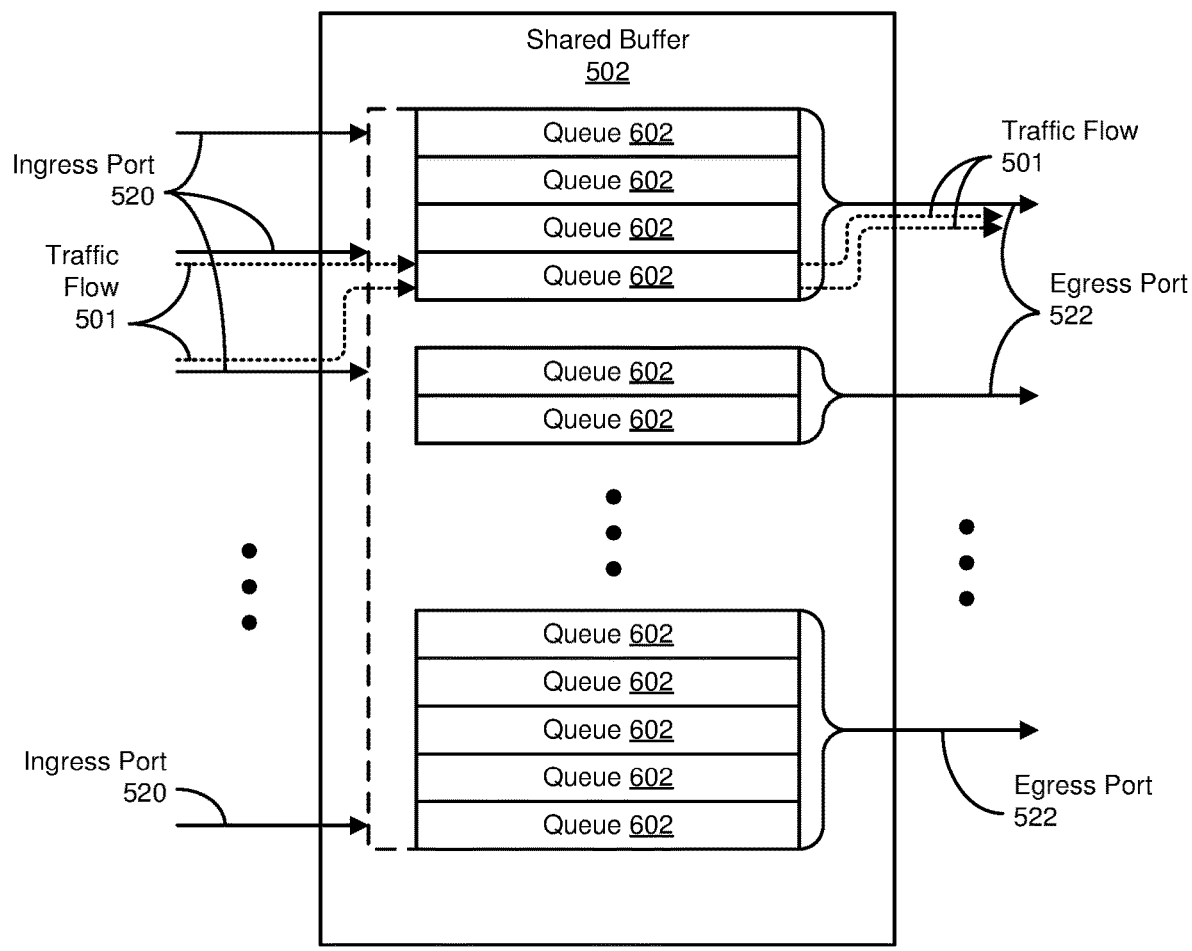
FIG. 6 is a block diagram of an exemplary shared buffer employable in the IP network switch of FIG. 5.
Figure 7:
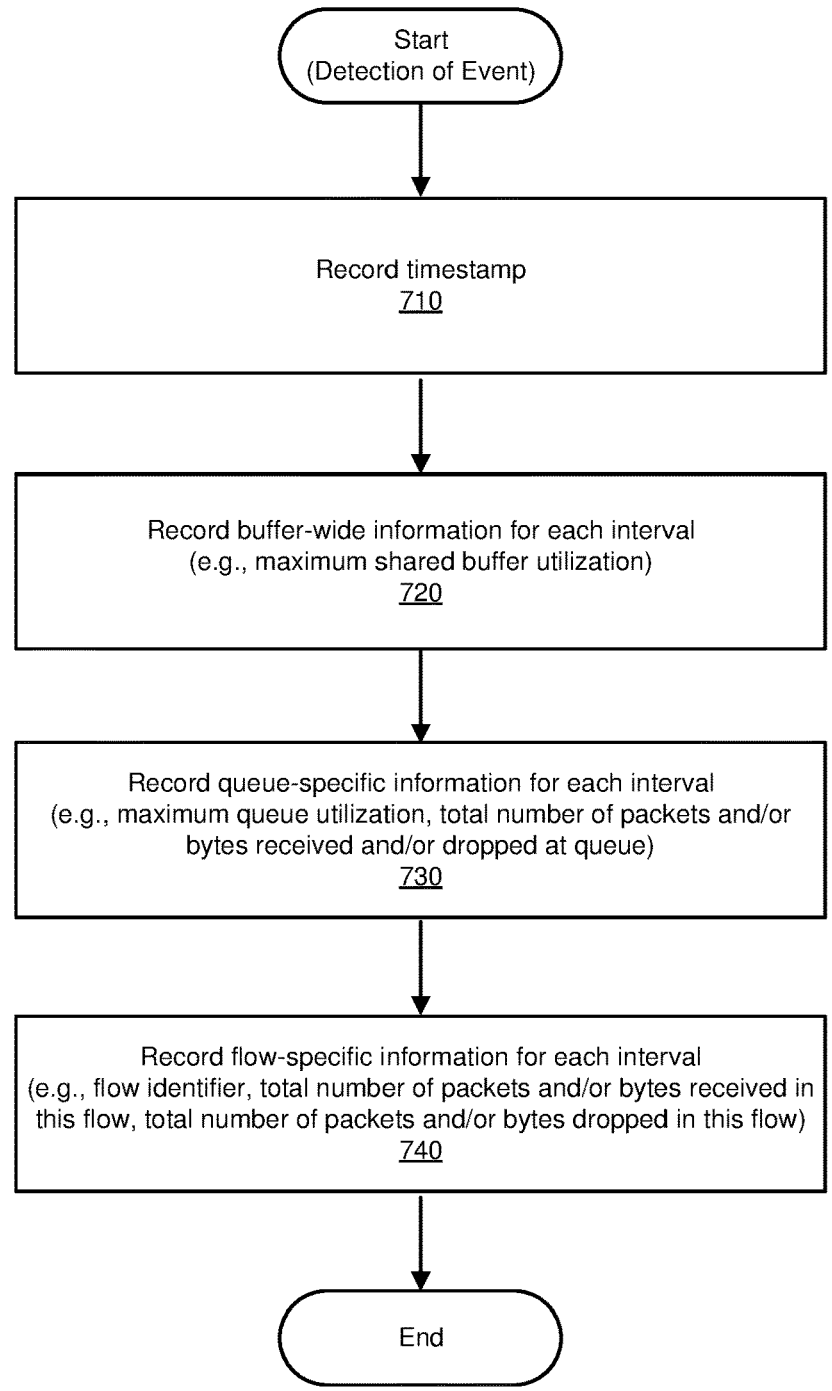
FIG. 7 is a flow diagram of an exemplary method of sampling status data in the IP network switch of FIG. 5.

The following will provide, with reference to FIGS. 1-8, detailed descriptions of systems and methods for monitoring communication system resource contention. Initially, a brief description of a communication system in which various embodiments discussed below may be implemented is discussed in conjunction with FIG. 1. An exemplary method of communication resource monitoring is provided in connection with FIG. 2, and a block diagram of an exemplary communication resource capable of providing such monitoring is described in relation to FIG. 3. Further, an exemplary sampling operation employable in the communication resource of FIG. 3 is discussed with respect to FIG. 4. An exemplary Internet Protocol (IP) network switch that may serve as the communication resource of FIG. 3 is described in connection with FIG. 5. The use of a shared buffer as a component of contention within the IP network switch of FIG. 5 is discussed in conjunction with FIG. 6. With reference to FIG. 7, a method for sampling status data associated with the IP network switch of FIG. 5 is described. The subsequent use of the status data to control a communication system in which the communication resource is located is discussed with reference to FIG. 8.

FIG. 1 is a block diagram providing a partial view of an exemplary communication system 100 in which various systems and methods of monitoring a communication resource 110 described hereinafter may be implemented. As shown, communication system 100 may include communication endpoints 101 (e.g., communication data sources and destinations, such as computers, servers, processors, storage devices, and the like) coupled to each other by communication resources 110 (e.g., network interface cards (NICs), routers, hubs, switches, data links, and the like). In addition, the communication data may be generated and/or consumed by one or more applications 102 executing on communication endpoints 101. In at least some embodiments, one or more communication resources 110 may couple one or more pairs of communication endpoints 101.

In some embodiments, communication system 100 may be any packet-switching communication system that may include network components, links, or other resources that are possible points of contention or congestion. In some embodiments, communication system 100 may be a wide area network (WAN), local area network (LAN), or some combination thereof that employs TCP/IP (Transmission Control Protocol/Internet Protocol) to transmit data packets between computing systems, servers, and the like serving as communication endpoints 101. In other examples, communication system 100 may include one or more communication links, and other communication resources within a computer system, such as the Peripheral Component Interconnect Express (PCI-e) interface. In such examples, possible points of contention include, but are not limited to, data links, switches, and so on.

FIG. 2 is a flow diagram of an exemplary method 200 of monitoring a communication resource (e.g., communication resource 110) of a communication system (e.g., communication system 100). In at least some examples, the various steps of method 200 may be performed within the communication resource 110 being monitored, thus possibly facilitating faster generation of useful status data for communication resource 110 than is traditionally available. Further, in some examples, one or more of the various steps of method 200 may be performed in hardware (e.g., digital logic circuits), as opposed to relying on firmware-based register access by a microprocessor.

At step 210, an event indicative of traffic congestion in communication resource 110 may be detected. Examples of such an event may include, but are not limited to, the loss of a data packet, and the filling of data packets into a buffer or other memory element beyond a predetermined threshold. In such examples, communication resource 110 services one or more traffic flows, at least one of which may cause the event. In some embodiments, a traffic flow may be a sequence of packets transmitted over communication system 100 from a source (e.g., a source communication endpoint 101) to a destination (e.g., a destination communication endpoint 101). A traffic flow may also be associated with a particular application at the source and at the destination. In some examples, a traffic flow may be viewed as representing a communication connection between the source and the destination. In some examples, one particular traffic flow may be identified as the source of traffic congestion, while in others, two or more traffic flows may have collectively caused the detected event.

At step 220, in relation to detecting the event, status data indicating a current status of communication resource 110 may be sampled during each of a plurality of time intervals. In some embodiments, the time intervals may be contiguous, and the number of time intervals sampled may be set in advance of the sampling. Also, in some examples, the detection of the event may initiate the sampling of the first interval. In other embodiments, sampling may occur as a background operation prior to the event, such that when the event occurs, a predetermined number of samples of the current status of communication resource 110 have already been captured prior to the event. In such embodiments, this pre-sampling facilitates the capture of data regarding the status of communication resource 110 prior to the event.

In some embodiments, the status data may include data describing the current status of communication resource 110 from a number of sources within communication resource 110. The types of status data may include, but are not limited to, an average or maximum utilization of a buffer, queue, and/or other data structure within communication resource 110 during each time interval, a number of data bytes and/or data packets transferred through, or lost at, communication resource 110 for each traffic flow or data queue during each time interval, and the like. In some examples, the status data may include data from communication resource 110 regarding any traffic flow, data queue, or the like associated with communication resource 110, including those not contributing to the event (e.g., those traffic flows not causing the congestion, those traffic flows not affected by congestion, and so on). Moreover, in some embodiments, the status data may be sampled such that all resulting status data are captured in a temporally coherent manner (e.g., the corresponding status data regarding multiple traffic flows, data queues, and so on are sampled during the same time intervals).

In some embodiments, the sampled status data may be filtered to retain some portion of the status data associated with at least one of the traffic flows. In some embodiments, the status data for those one or more traffic flows that contributed to the event (e.g., those traffic flows for which a packet was lost, or which caused the amount of data in a buffer or queue to exceed some threshold) are those that are retained, while the status data for some or all of the remaining traffic flows serviced by communication resource 110 may be ignored. In yet other examples, such filtering may not be performed, or may be based on parameters other than whether the associated traffic flow contributed to the event. In other examples, other types of data reduction, such as algorithmic data compression, may be employed in lieu of or addition to the filtering of status data describe above.

At step 230, either or both of the status data of communication resource 110 for each of the time intervals (or at least some portion of this status data) or control information for at least one of the traffic flows (e.g., based on the status data for the traffic flows) may be transmitted to a receiving device external to communication resource 110. In some examples, the receiving device may be another communication resource 110 and/or communication endpoint 101, such as one associated with the one or more traffic flows associated with the detected event. Also, in some examples, the status data and/or control information may be transmitted to a collecting device employed for such a purpose. The status data and/or control information from communication resource 110, and possibly other communication resources 110, may be used to control the operation of communication system 100, such as by controlling the path and/or data rate of the traffic flows that may contribute to the congestion associated with the detected event.

FIG. 3 is a block diagram of an exemplary communication resource 300 that may serve as communication resource 110 of FIG. 1. As shown, communication resource 300 may include a contention component 302 through which one or more traffic flows 301 may pass while transiting through communication system 100. Traffic flows 301, in some embodiments, may be received and/or transmitted over wired or wireless communication links. Examples of contention component 302 may include one or more data buffers for temporarily storing data packets received by communication resource 110 before being transmitted from communication resource 110. Also included in communication resource 300 may be an event detection circuit 304, a data sampling circuit 306, a data filtering circuit 308, and a data transmission circuit 310, each of which may perform the corresponding operations described above in conjunction with method 200 of FIG. 2. In some examples, one or more of circuits 304-310 may be implemented using hardware digital logic to effect accelerated data sampling, processing, and transmission, thus facilitating the capture of data indicative of micro-burst transmissions. Such hardware may also employ, in some embodiments, an embedded processor core or other processing device capable of executing instructions that employ an instruction set provided by the device to perform the various data sampling, processing, and transmission operations discussed herein. Additional components other than those depicted in FIG. 3, such as a processor and general-purpose memory for storing processor-executable instructions, may also be included in some examples of communication resource 300.

FIG. 4 is a timing diagram of an exemplary sampling operation 400 that may be performed by data sampling circuit 306 of communication resource 300. As shown, status data is sampled in each of a plurality of contiguous time intervals 402 in relation to a detected event 401. Also, as illustrated in FIG. 3, sampling may be performed on an ongoing basis so that the detection of event 401 facilitates the sampling of status data prior to detected event 401 in addition to sampling such data after detected event 401. Additionally, such sampling of status data may be employed to perform the detection of event 401, such as when the status data being sampled is also employed to determine whether event 401 has occurred.

FIG. 5 is a block diagram of an IP network switch 500 that may serve as communication resource 300 of FIG. 3 within an IP communication network. As depicted in FIG. 5, IP network switch 500 may include one or more ingress ports 520 that receive data packets of one or more traffic flows 501 and one or more egress ports 522 that transmit the received data packets toward a destination in the IP network. In some examples, such as in an Ethernet IP switch, an ingress port 520 and a corresponding egress port 522 may both be coupled to an Ethernet hardware port to facilitate bidirectional communication. Also, in some embodiments, an ingress port 520 and a corresponding egress port 522 may be coupled to a wireless access point (WAP) to facilitate bidirectional wireless communication.

IP network switch 500, in at least some examples, may include a shared buffer 502 (e.g., serving as contention component 302 of FIG. 3) that is shared by egress ports 522 and that temporarily stores data packets received via ingress ports 520 before being transferred over one or more egress ports 522. In some embodiments, each ingress port 520 may be associated with a small input buffer (not illustrated in FIG. 5) that receives data from its associated ingress port 520 before forwarding that data to shared buffer 502, but these input buffers do not typically operate as a significant source of congestion, and thus are not discussed more fully herein.

Also included in IP network switch 500 are an event detection circuit 504, a data sampling circuit 506, a data filtering circuit 508, and a data transmission circuit 510, each of which may serve as event detection circuit 304, data sampling circuit 306, data filtering circuit 308, or data transmission circuit 310, as described above. In some embodiments, at least one of data sampling circuit 506, data filtering circuit 508, and data transmission circuit 510 may be incorporated as digital logic within an application-specific integrated circuit (ASIC) that may also include logic for operating shared buffer 502 and may also include the memory for shared buffer 502.

FIG. 6 is a block diagram of shared buffer 502 illustrating the use of a plurality of queues 602 (e.g., first in, first out (FIFO) queues) therewithin. In some embodiments, each ingress port 520 may forward received data packets into one or more queues 602. Further, each egress port 522 may be coupled to a particular one or more queues 602 located in shared buffer 502. In addition, each queue 602 may receive data packets associated with one or more specific traffic flows 501. The association of queues 602 to egress ports 522 and the association of traffic flows 501 to queues 602 may be modified over time. Also, in some examples, assignment of traffic flows 501 to queues 602 may be based in part on a class of service (CoS) and/or a priority associated with each traffic flow 501, the use of equal-cost multi-path (ECMP) routing strategies, and other variables. Additionally, other arrangements of queues 602 within shared buffer 502 aside from those depicted in FIG. 6 are possible in other embodiments.

Returning to FIG. 5, event detection circuit 504 may detect an event that potentially indicates traffic congestion in IP network switch 500. In some embodiments, such an event may constitute a root cause of a service level agreement (SLA) violation, such as a p99 ($99^{th}$ percentile) latency violation, in which more than one percent of data transfer requests associated with a particular service exceed some predetermined latency between the request and the receipt of the data. In some examples, the event may be detected from one or more types of status data available in IP network switch 500, such as a maximum or average level of utilization of shared buffer 502 and/or one or more queues 602 exceeding a threshold, the number of dropped data packets of one or more traffic flows 501 exceeding a threshold, or the like. Further, in some embodiments, a selection of status data employed to detect the event, as well an indication of how more than one item of status data may be combined (e.g., by logical OR, logical AND, etc.) to signify the event, may be user-configurable, such as by way of a user interface incorporated in IP network switch 500. In addition, one or more particular traffic flows 501 to be monitored for event detection may also be user-configurable in some examples.

Data sampling circuit 506, in some embodiments, may sample status data of one or more types that are available in IP network switch 500 for each of a plurality of time intervals in relation to the detected event. The sampled status data may include, for example, a maximum or average level of utilization of shared buffer 502 and/or one or more queues 602 during each time interval, the number of dropped and/or transmitted data bytes or packets of each of one or more traffic flows 501 during each time interval, an identifier for each of the traffic flows 501, and so on. In some examples, the timing interval (e.g. 50 microseconds (μsec), 100 μsec, or the like) and/or number of time intervals per detected event (e.g., 16 intervals) may be user-configurable.

Data filtering circuit 508 may filter the sampled status data to reduce the overall amount of data to ultimately transmit. In some embodiments, the status data to be retained may be restricted to one or more traffic flows 501 that contributed to the event that was detected. In other examples, the sampled status data may be restricted further to those traffic flows 501 specified by a user (e.g., via configuration data written to IP network switch 500). In some embodiments, the filtered status data may also be compressed (e.g., using a data compression algorithm) to further reduce the amount of status data representing the detected event.

Data transmission circuit 510 may transmit the filtered status data associated with the detected event to a device external to IP network switch 500. In some embodiments, data transmission circuit 510 may package the filtered status data in one or more data packets, with appropriate IP headers, and transmit the one or more data packets via an egress port 522 to another device associated with the IP network, such as a communication resource (e.g., another IP network switch 500) that provided data packets for one or more traffic flows 501 received by IP network switch 500 (e.g., one or more traffic flows 501 contributing to the detected event). In other examples, data transmission circuit 510 may transmit the filtered status data to a data collection server or similar device configured to receive such data from IP network switch 500, as well as from other IP network switches 500. Further, in some examples, the filtered data may be formatted and transmitted according to the IP Flow Information Export (IPFIX) protocol.

In some embodiments, IP network switch 500 may include data storage for multiple sets of filtered status data (e.g., with each set or "view" being associated with a corresponding detected event), thus enabling data transmission circuit 510 to control the timing, data rate, and other parameters of the transmission of that data. In some examples, data transmission circuit 510 may be configured to rate-shape (e.g., set a maximum data rate for) the transmissions. In some examples, IP network switch 500 may store a number of views locally (e.g., within the ASIC that includes IP network switch 500) to facilitate user access to the views via a user interface and/or associated application programming interface (API), as well as possibly resetting the locally stored views.

In some embodiments, in addition to or in lieu of status data (filtered or not), data transmission circuit 510 may transmit control information to control one or more traffic flows 501 to a device external to IP network switch 500 (e.g., another IP network switch, a communication endpoint, or the like that provides the one or more traffic flows 501 received at IP network switch 500). In such embodiments, data transmission circuit 510, data sampling circuit 506, or another portion of IP network switch 500 may include control logic that determines which traffic flows 501 should be controlled (e.g., based on the sampled status data for traffic flows 501), the timing of that control, and so on. For example, IP network switch 500 may employ a flow control mechanism (e.g., at a network layer or data link layer) available within the communication network based on the status data captured within IP network switch 500. In the case of an Ethernet network, such control may be asserted using the Ethernet Priority-Based Flow Control (PFC) mechanism or the Ethernet "pause" function, which may temporarily halt traffic associated with one or more traffic classes on or more ingress ports 520. Other types of control information to modify the data transmission behavior of another device in the network may be employed in other embodiments.

FIG. 7 is a flow diagram of an exemplary method 700 of sampling status data in IP network switch 500. At step 710, a timestamp associated with the detection of the event may be recorded in IP network switch 500. In some examples, the timestamp may correspond to the time at which the event was detected, or the time at which the first of the plurality of time intervals during which the status data is sampled. At step 720, status data associated generally with shared buffer 502 (e.g., an average and/or maximum utilization of shared buffer 502, such as in terms of a percentage of shared buffer 502 utilized or filled) may be recorded for each time interval. At step 730, status data specific to each queue 602 within shared buffer 502 (e.g., an average and/or maximum utilization of each queue 602, a total number of data bytes or packets received and/or dropped at each queue 602, and identifier of a particular egress port 522 associated with each queue 602, and so on) may be recorded for each time interval. At step 740, status data associated with each particular traffic flow 501 (e.g., an identifier for traffic flow 501, a total number of packets and/or bytes received for traffic flow 501, a total number of packets and/or bytes dropped for traffic flow 501, an identifier of a particular egress port 522 and/or queue 602 associated with each traffic flow 501, and the like) may also be recorded for each time interval. In some examples, the identifier for traffic flow 501 may be an TCP/IP "five-tuple" (e.g., the source IP address and port number, the destination IP address and port number, and the communication protocol employed) associated with that traffic flow 501. Altogether, such information may constitute a view for the associated detected event.

Figure 8:
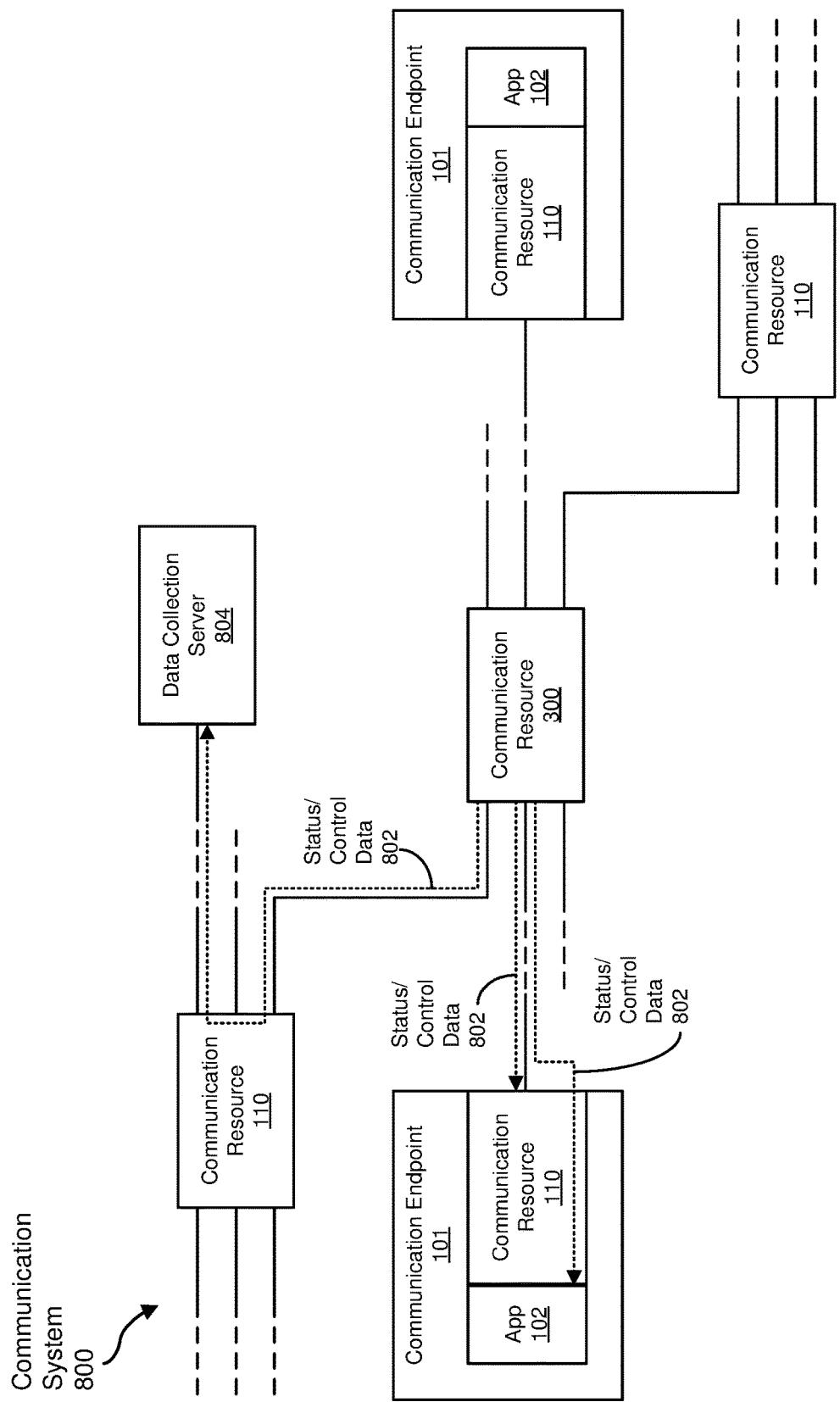
FIG. 8 is a block diagram of an exemplary communication system employing the communication resource of FIG. 3.

FIG. 8 is a block diagram of an exemplary communication system 800 employing communication resource 300 of FIG. 3. As indicated, status/control data 802 generated at communication resource 300 may be transmitted to one or more different components or entities of communication system 800 to facilitate analysis of network traffic flows 301, as well as to enable control of communication system 800 to reduce congestion issues. For example, communication resource 300 (e.g., by data transmission circuit 310) may transmit status/control data 802 to another communication resource 110 (e.g., a source of a problematic traffic flow 301) so that communication resource 110 (e.g., an NIC, a switch, a hub, a router, etc.) may control its transmission of data packets for one or more traffic flows 301 (e.g., at the data link, network, or IP level) to prevent the type of congestion detected at communication resource 300. An example of this type of control may involve the use of a flow control mechanism such as Ethernet PFC or Pause control by communication resource 300, as discussed above.

In other examples, communication resource 300 may provide status/control data 802 to application 102 of communication endpoint 101 such that application 102 may modify its own behavior (e.g., modulate or otherwise alter the data rate at which it produces data packets for traffic flows 301 via communication resource 110) to mitigate congestion at communication resource 300. In some examples, communication endpoint 101 may also include a conversion module (not shown in FIG. 8) that converts the identity of traffic flows 301 to particular data streams identifiable at the level of application 102 so that it may identify which data streams are contributing to network congestion.

In another embodiment, communication resource 300 may transmit status/control data 802 as network telemetry (e.g., using the IPFIX protocol) via communication system 800 to a data collection server 804. In some examples, data collection server 804 may collect such information from multiple communication resources 300, thus providing status data over a wider scope of communication system 800, possibly facilitating greater coordination and control of a variety of traffic flows 301 by way of alteration of communication paths, traffic flow priorities, data packet transfer rates, and so on.

As discussed above in conjunction with FIGS. 1-8, systems and methods described herein may facilitate faster, higher-resolution monitoring and feedback of potential congestion of communication system resources. For example, such monitoring may facilitate identification of "aggressor" traffic flows (e.g., those traffic flows causing congestion) and corresponding "victim" traffic flows (e.g., those traffic flows negatively affected by one or more aggressor traffic flows, resulting in delayed or dropped data packets, retransmission of dropped data packets, and the like). Given timely access to such information, effective communication system control at various levels of abstraction (e.g., at the data link, network, IP, and/or application layers) to quickly mitigate traffic congestion is possible.

EXAMPLE EMBODIMENTS

Example 1: A method for monitoring a communication resource of a communication system may include (1) detecting, by the communication resource, an event indicative of traffic congestion in the communication resource, where the communication resource services one or more traffic flows, and where at least one of the traffic flows causes the event, (2) sampling, by the communication resource, in relation to detecting the event, status data indicating a current status of the communication resource during each of a plurality of time intervals, and (3) transmitting, by the communication resource, to a receiving device external to the communication resource to control the communication system, at least one of (a) at least a portion of the status data that is associated with the at least one of the traffic flows or (b) control information for the at least one of the traffic flows based on at least a portion of the status data that is associated with the at least one of the traffic flows.

Example 2: The method of Example 1, where detecting the event may include detecting a loss of communication data at the communication resource.

Example 3: The method of Example 1, where detecting the event may include detecting a utilization level of a communication data queue of the communication resource exceeding a threshold.

Example 4: The method of Example 1, where the current status of the communication resource during each of the plurality of time intervals may include an amount of communication data lost at the communication resource for each traffic flow through the communication resource.

Example 5: The method of Example 1, where the current status of the communication resource may include a utilization of a communication data queue of the communication resource during each of the plurality of time intervals.

Example 6: The method of Example 1, where the method may further include filtering, by the communication resource, the status data to retain the portion of the status data that is associated with the at least one of the traffic flows.

Example 7: The method of Example 1, where the method may further include controlling, by a communication device external to the communication resource, a transmission of the at least one of the traffic flows serviced by the communication resource.

Example 8: The method of any of Examples 1-7, where (1) the communication system may include a packet-switching communication network, and (2) the communication resource may include a network switch.

Example 9: The method of Example 8, where (1) the network switch may include (a) one or more ingress ports that receive data packets, (b) one or more egress ports that transmit the data packets received by the one or more ingress ports, and (c) at least one buffer that temporarily stores at least some of the data packets before being transmitted by the egress ports, and (2) the current status of the communication resource may include a current status of the at least one buffer during each of the plurality of time intervals.

Example 10: The method of Example 9, where (1) the at least one buffer may include a shared buffer shared by the egress ports, and (2) the current status of the communication resource may include a maximum utilization of the shared buffer during each of the plurality of time intervals.

Example 11: The method of Example 9, where (1) the at least one buffer may include a shared buffer shared by the egress ports, (2) each of the egress ports may receive communication data of at least one of the traffic flows serviced by the communication resource from at least one of the ingress ports via one or more communication queues associated with the egress port, and (3) the current status of the communication resource may include, for each communication queue, a maximum utilization of the communication queue during each of the plurality of time intervals.

Example 12: The method of Example 9, where (1) the buffer may include a shared buffer shared by the egress ports, (2) each of the egress ports may receive data packets of at least one of the traffic flows serviced by the communication resource from at least one of the ingress ports via one or more communication queues associated with the egress port, and (3) the current status of the communication resource may include, for each communication queue, a number of data packets dropped at the communication queue during each of the plurality of time intervals.

Example 13: The method of Example 9, where (1) the buffer may include a shared buffer shared by the egress ports, (2) each of the egress ports may receive data packets of at least one of the traffic flows serviced by the communication resource from at least one of the ingress ports via one or more communication queues associated with the egress port, and (3) the current status of the communication resource may include, for each traffic flow of each communication queue, an identifier for the traffic flow and at least one of (a) a number of data packets dropped in the traffic flow during each of the plurality of time intervals, or (b) a number of data packets received for the traffic flow at the communication queue during each of the plurality of time intervals.

Example 14: The method of any of Examples 1-8, where (1) the communication system may include a packet-switching computer system bus, and (2) the communication resource may include a bus switch.

Example 15: A communication resource of a communication system, where the communication resource may include (1) a buffer memory that stores data of one or more traffic flows transiting the communication resource, (2) an event detection circuit that detects an event indicative of traffic congestion at the buffer memory caused by at least one of the traffic flows, (3) a data sampling circuit that samples, in relation to the event detection, status data indicating a current status of the communication resource during each of a plurality of time intervals, and (4) a data transmission circuit that transmits, to a receiving device external to the communication resource to control the communication system, at least one of (a) at least a portion of the status data that is associated with the at least one of traffic flows or (b) control information for the at least one of the traffic flows based on at least a portion of the status data that is associated with the at least one of the traffic flows.

Example 16: The communication resource of Example 15, where the method may further include (1) one or more ingress ports that receive data packets, and (2) one or more egress ports that transmit the data packets received by the one or more ingress ports, where the buffer memory temporarily stores the data packets before being transmitted by the one or more egress ports, and where the status data includes a current status of the buffer memory.

Example 17: The communication resource of Example 16, where the current status of the communication resource during each of the plurality of time intervals may include a utilization of the buffer memory during each of the plurality of time intervals.

Example 18: The communication resource of Example 16, where the current status of the communication resource during each of the plurality of time intervals may include at least one of (1) a number of data packets dropped at the buffer memory, (2) an amount of data dropped at the buffer memory, (3) a number of data packets received in the buffer memory, or (4) an amount of data received in the buffer memory.

Example 19: The communication resource of Example 16, where the portion of the status data may include a timestamp corresponding to the plurality of time intervals.

Example 20: An Internet Protocol (IP) network switch of an IP network, where the IP network switch may include (1) a buffer that stores data packets of one or more traffic flows from one or more ingress ports before being transmitted by one or more egress ports, (2) a detection circuit that detects an event indicative of traffic congestion in the IP network switch caused by at least one of the traffic flows, (3) a sampling circuit that samples, in relation to the event detection, status data indicating a current status of the IP network switch over a plurality of time intervals, and (4) a transmission circuit that transmits, over the IP network to a receiving device to control the IP network, at least one of (a) at least a portion of the status data that is associated with the at least one of the traffic flows or (b) control information for the at least one of the traffic flows based on at least a portion of the status data that is associated with the at least one of the traffic flows.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A method of monitoring a network switch of a communication system, the method comprising:
   receiving a micro-burst condition;
   configuring an application-specific integrated circuit of the network switch to:
      generate, in response to instances of the micro-burst condition being satisfied at the network switch, a micro-burst view comprising a plurality of data points sampled over a plurality of continuous sampling intervals; and
      refrain from generating or transmitting any additional micro-burst views during at least one extended time interval between instances of the micro-burst condition being satisfied at the network switch, wherein the application-specific integrated circuit services one or more traffic flows at the network switch;
   detecting, by the application-specific integrated circuit concurrent with servicing the one or more traffic flows, an instance of the micro-burst condition being satisfied at the network switch;
   generating, by the application-specific integrated circuit concurrent with servicing the one or more traffic flows, the micro-burst view by sampling each of the plurality of data points in response to the instance of the micro-burst condition being satisfied at the network switch, wherein:
      each of the plurality of data points is sampled during a corresponding one of the plurality of continuous sampling intervals; and
      each of the plurality of data points indicates at least one of:
         a measurement of one or more components of the network switch made during the corresponding one of the plurality of continuous sampling intervals; or
         a measurement of the one or more traffic flows made during the corresponding one of the plurality of continuous sampling intervals; and
   transmitting, by the application-specific integrated circuit, the plurality of data points to a receiving device external to the network switch as part of the micro-burst view.

2. The method of claim 1, wherein:
   the micro-burst view comprises at least sixteen data points sampled during a corresponding one of at least sixteen continuous sampling intervals; and
   each of the plurality of continuous sampling intervals is fifty microseconds long.

3. The method of claim 1, wherein:
   the network switch comprises:
      one or more ingress ports that receive data packets;
      one or more egress ports that transmit the data packets received by the one or more ingress ports; and
      at least one buffer that temporarily stores at least some of the data packets before being transmitted by the one or more egress ports; and
   each of the plurality of data points comprises a measurement of the at least one buffer made by the application-specific integrated circuit during the corresponding one of the plurality of continuous sampling intervals.

4. The method of claim 3, wherein:
the at least one buffer comprises a shared buffer shared by the egress ports; and
each of the plurality of data points comprises a maximum utilization of the shared buffer measured by the application-specific integrated circuit during the corresponding one of the plurality of continuous sampling intervals.

5. The method of claim 3, wherein:
the at least one buffer comprises a shared buffer shared by the egress ports;
each of the egress ports receives communication data of at least one of the traffic flows from the application-specific integrated circuit via one or more communication queues associated with the egress port; and
each of the plurality of data points comprises, for each communication queue, a maximum utilization of the communication queue measured by the application-specific integrated circuit during the corresponding one of the plurality of continuous sampling intervals.

6. The method of claim 3, wherein:
the buffer comprises a shared buffer shared by the egress ports;
each of the egress ports receives data packets of at least one of the traffic flows from the application-specific integrated circuit via one or more communication queues associated with the egress port; and
each of the plurality of data points comprises, for each communication queue, a number of data packets dropped at the communication queue measured by the application-specific integrated circuit during the corresponding one of the plurality of continuous sampling intervals.

7. The method of claim 3, wherein:
the buffer comprises a shared buffer shared by the egress ports;
each of the egress ports receives data packets of at least one of the traffic flows serviced from the application-specific integrated circuit via one or more communication queues associated with the egress port; and
each of the plurality of data points comprises, for each traffic flow of each communication queue, an identifier for the traffic flow and at least one of:
  a number of data packets dropped in the traffic flow during the corresponding one of the plurality of continuous sampling intervals; or
  a number of data packets received for the traffic flow at the communication queue during the corresponding one of the plurality of continuous sampling intervals.

8. The method of claim 1, further comprising:
detecting, by the application-specific integrated circuit concurrent with servicing the one or more traffic flows, an additional instance of the micro-burst condition being satisfied at the network switch;
generating, by the application-specific integrated circuit concurrent with servicing the one or more traffic flows, an additional micro-burst view by sampling each of an additional plurality of data points in response to the additional instance of the micro-burst condition being satisfied at the network switch, wherein:
  each of the additional plurality of data points is sampled during a corresponding one of an additional plurality of continuous sampling intervals; and
  each of the additional plurality of data points indicates at least one of:
    a measurement of the one or more components of the network switch made during the corresponding one of the additional plurality of continuous sampling intervals; or
    a measurement of the one or more traffic flows made during the corresponding one of the additional plurality of continuous sampling intervals;
transmitting, by the application-specific integrated circuit, the additional plurality of data points to the receiving device external to the network switch as part of the additional micro-burst view.

9. The method of claim 8, further comprising refraining, by the application-specific integrated circuit, from sampling or transmitting any additional data points during an extended time interval between the instance and the additional instance.

10. The method of claim 8, further comprising storing, by the application-specific integrated circuit, the plurality of data points and the additional plurality of data points at the network switch for later transmittal.

11. The method of claim 10, further comprising:
receiving, by the network switch, a request for the plurality of data points and the additional plurality of data points from an additional receiving device external to the network switch;
transmitting, by the network switch in response to the request, the plurality of data points and the additional plurality of data points to the additional receiving device.

12. The method of claim 1, wherein:
the micro-burst condition is received from an administrator of the network switch; and
the method further comprises receiving, from the administrator of the network switch, a first value indicating the number of data points in the plurality of data points and a second value indicating the length of each of the plurality of continuous sampling intervals, the first and second values being used to configure the application-specific integrated circuit of the network switch.

13. A switching resource of a communication system, the switching resource comprising:
a buffer memory that stores data of traffic flows transiting the switching resource; and
a single application-specific integrated circuit that:
  services the traffic flows by operating the buffer memory;
  includes an interface for configuring the single application-specific integrated circuit to:
    generate, in response to instances of a micro-burst condition being satisfied at the switching resource, a micro-burst view comprising a plurality of data points sampled over a plurality of continuous sampling intervals; and
    refrain from generating or transmitting any additional micro-burst views during at least one extended time interval between instances of the micro-burst condition being satisfied at the switching resource;
  detects, concurrently with servicing the traffic flows, an instance of the micro-burst condition being satisfied at the switching resource;
  generates, concurrently with servicing the traffic flows, the micro-burst view by sampling each of the plurality of data points in response to the instance of the micro-burst condition being satisfied at the switching resource, wherein:

each of the plurality of data points is sampled during a corresponding one of the plurality of continuous sampling intervals; and
each of the plurality of data points indicates at least one of:
a measurement of one or more components of the switching resource made during the corresponding one of the plurality of continuous sampling intervals; or
a measurement of the traffic flows made during the corresponding one of the plurality of continuous sampling intervals; and
transmits the plurality of data points to a receiving device external to the switching resource as part of the generated micro-burst view.

14. The switching resource of claim 13, further comprising:
one or more ingress ports that receive data packets; and
one or more egress ports that transmit the data packets received by the one or more ingress ports, wherein the single application-specific integrated circuit temporarily stores the data packets to the buffer memory before the data packets are transmitted by the one or more egress ports, and wherein each of the plurality of data points comprises a measurement of the buffer memory sampled during the corresponding one of the plurality of continuous sampling intervals.

15. The switching resource of claim 14, wherein the measurement of the buffer memory comprises a measurement of utilization of the buffer memory.

16. The switching resource of claim 14, wherein the measurement of the buffer memory comprises a measurement of at least one of:
a number of data packets dropped at the buffer memory;
an amount of data dropped at the buffer memory;
a number of data packets received in the buffer memory; or
an amount of data received in the buffer memory.

17. An Internet Protocol (IP) network switch of an IP network, the IP network switch comprising:
a buffer that stores data packets received from one or more ingress ports before being transmitted by one or more egress ports; and
a single application-specific integrated circuit that:
stores the data packets to the buffer as part of servicing one or more traffic flows;
includes an interface for configuring the single application-specific integrated circuit to:
generate, in response to instances of a micro-burst condition being satisfied at the IP network switch, a micro-burst view comprising a plurality of data points sampled over a plurality of continuous sampling intervals; and
refrain from generating or transmitting any additional micro-burst views during at least one extended time interval between instances of the micro-burst condition being satisfied at the IP network switch;
detects, concurrently with servicing the traffic flows, an instance of the micro-burst condition being satisfied at the IP network switch;
generates, concurrently with servicing the traffic flows, the micro-burst view by sampling each of the plurality of data points in response to the instance of the micro-burst condition being satisfied at the IP network switch, wherein:
each of the plurality of data points is sampled during a corresponding one of the plurality of continuous sampling intervals; and
each of the plurality of data points indicates at least one of:
a measurement of one or more components of the IP network switch made during the corresponding one of the plurality of continuous sampling intervals; or
a measurement of the traffic flows made during the corresponding one of the plurality of continuous sampling intervals; and
transmits the plurality of data points to a receiving device external to the IP network switch as part of the generated micro-burst view.

18. The IP network of claim 17, wherein each of the plurality of data points comprises a maximum utilization level of the buffer measured during the corresponding one of the plurality of continuous sampling intervals.

19. The IP network of claim 17, wherein:
the one or more egress ports comprises a queue to which the single application-specific integrated circuit may forward one or more of the data packets for transmittal via the one or more egress ports; and
each of the plurality of data points comprises a maximum utilization level of the queue measured during the corresponding one of the plurality of continuous sampling intervals.

20. The IP network of claim 17, wherein:
the one or more egress ports comprises a queue to which the single application-specific integrated circuit may forward one or more of the data packets for transmittal via the one or more egress ports; and
each of the plurality of data points comprises a number of data packets dropped at the queue during the corresponding one of the plurality of continuous sampling intervals.

* * * * *